Oct. 23, 1951      H. N. GIBSON      2,572,468
CAMERA TRIPOD
Filed Nov. 29, 1946
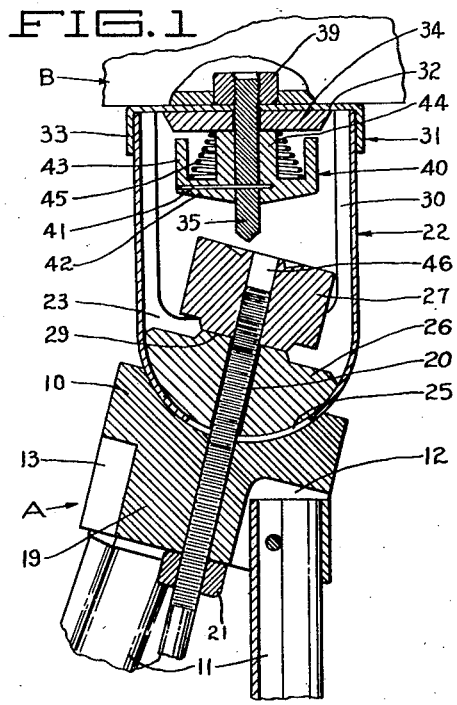
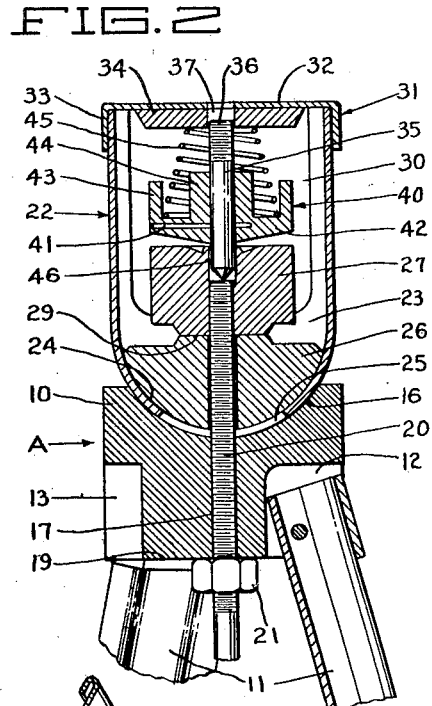
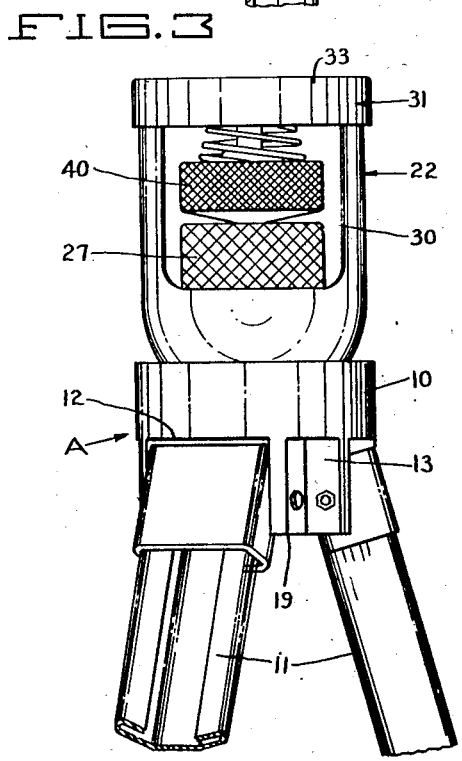
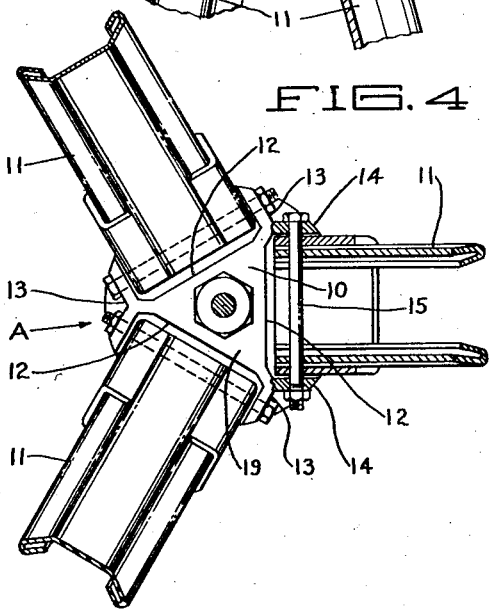
Inventor
Horace N. Gibson
By Robert M. Dunning
Attorney Patented Oct. 23, 1951

2,572,468

UNITED STATES PATENT OFFICE 2,572,468

CAMERA TRIPOD

Horace N. Gibson, St. Paul, Minn.

Application November 29, 1946, Serial No. 713,008

7 Claims. (Cl. 248—181)

My invention relates to an improvement in camera tripod and deals more particularly in a swivel head connecting the legs of the tripod to the camera.

It is the object of the present invention to provide a swivel head for supporting a camera on the top of the tripod so that it may be readily adjusted to the desired angle. My swivel head is easy and quick to operate and may be simply and economically made.

A feature of the present invention lies in the provision of a socket on the top of a tripod in which a tubular swivel head is mounted. This tubular swivel head is held in the desired position relative to the socket by means of a clamping arrangement which is readily accessible and which may be easily and quickly operated.

A feature of the present invention lies in the provision of a threaded clamping means rotatably supported within the tubular swivel head. The opposite sides of the swivel head are cut away so as to render the threaded clamping element readily accessible.

A feature of the present invention lies in the provision of a camera bolt designed to extend into a suitable socket on the camera to hold the camera locked to the swivel head. The bolt is provided with a head positioned within the swivel head and accessible through the open opposite sides thereof.

A feature of the present invention lies in the provision of a retractable camera bolt and means for normally holding the bolt retracted. In tripod structures having a camera bolt normally projecting therefrom, the threads of the bolt are easily injured if the bolt is accidentally struck against an object while carrying the tripod. In my construction the threaded end of the bolt is normally retracted and is resiliently held in this retracted position so that the threads of the bolt can not be accidentally injured.

These and other objects and novel features of my invention will be more clearly and fully set forth in the following specification and claims.

In the drawings forming a part of my specification:

Figure 1 is a cross-sectional view through the head of the tripod showing the manner in which the tripod is connected to the camera.

Figure 2 is a view similar to Figure 1 showing the camera bolt in retracted position.

Figure 3 is an elevation view of the tripod head in detached position.

Figure 4 is a bottom plan view of the tripod head showing the construction thereof.

The tripod A includes a head body member 10. The legs 11 of the tripod are pivotally connected to this head member 10. As best illustrated in Figure 4 of the drawings, the lower end of the body member 10 is provided with three angularly spaced notches 12 into which the upper extremities of the legs 11 extend. V-shaped notches 13 are provided between the notches 12 so as to provide walls through which the pivot bolts may extend. The V-shaped notches 13 provide substantially parallel walls 14 through which pivoting bolts 15 may extend to hold the legs 11 pivotally connected to the head body 10.

A socket 16 having as its surface the segment of a sphere is provided in the upper surface of the body 10. This socket 16 is arranged axially of the body 12. An aperture 17 extends axially through the body 10 from the base of the socket 16 to the under-surface 19 of the body 10. This aperture 17 is designed to accommodate a threaded stud 20 which is anchored to the body and held from rotation relative thereto by a locking nut 21. The threaded bolt 20 extends upwardly from the body 10 a substantial distance. A swivel head 22 is adjustably supported in the socket 16. The swivel head 22 comprises a tubular body wall 23 which is formed inwardly at its lower extremity so that the lower end 24 thereof is arranged on the surface of a sphere. The outer surface of the lower part 24 of the swivel head is of substantially the same radius as the surface of the socket 16. The aperture 25 of substantial size is provided at the lower extremity of the tubular body 23. As a result the swivel head 22 may tilt at a substantial angle with respect to the axis of the body 10 if desired.

A swivel clamping member 26 is provided inside the lower end portion 24 of the swivel head 22. This clamping member 26 is provided with a spherical under-surface to fit the curvature of the inner surface of the curved lower extremity 24 of the swivel head 22. As a result the curved lower end of the swivel head may be engaged between the clamping member 26 and the head body 10 and held in any desired angular relation. The clamping nut 27 is threadably engaged on the bolt 20 and may be threaded against the flat upper surface 29 of the clamping member 26. By rotating the clamping nut 27 in one direction, the clamping member 26 may be urged toward the head body 10, clamping the curved lower end 24 of the swivel head in adjusted position. By rotating the clamping nut 27 in the opposite direction, the clamping force may be removed, allowing the swivel head 22 to be moved relative to the head 10 and the clamping member 26.

In order to permit easy adjustment of the clamping nut 27, I provide apertures 30 in opposite sides of the tubular body 23 of the clamping head through which the fingers may be inserted. The clamping nut 27 is provided with a roughened or knurled outer surface so that this nut may be easily engaged between the thumb and fingers and rotated in the desired direction.

In order to close the upper extremity of the swivel head 22, I provide a cap 31 including a top closure plate 32 and a depending peripheral skirt 33. The skirt 33 extends about the tubular swivel head body 23 at the upper extremity thereof and forms a top closure for this swivel head. The cap 31 may be secured to the swivel head body in any suitable manner, as by welding, soldering, or by the use of any suitable fastening means. The top plate 32 of the cap 31 is provided with a downwardly extending axial boss 34 which may be secured to the plate 32 or may be an integral part thereof.

A camera attaching bolt 35 has its threaded end 36 extending into the aperture 37 in the top plate 32 and boss 34. The aperture 37 is axially arranged in the cap. The threaded end 36 of the anchoring bolt is engageable into an internally threaded socket 39 in the camera B when it is so desired to secure the camera B to the tripod A.

In order to rotate the camera attaching bolt 35, I provide a nut or collar 40 which is connected to the bolt 35 for rotation therewith. As illustrated in Figures 1 and 2 of the drawings a pin 41 may extend through a portion of the nut 40 and through the bolt 35 to connect these elements for rotation in unison. The nut 40 includes a circular bottom flange 42 and a cylindrical peripheral flange 43 thereupon. A center hub or boss 44 is also provided integral with the circular flange 42, this boss 44 encircling the bolt 35. A cup shaped member is thus formed capable of receiving one end of a spring 45. The spring 45 bears against the circular flange 42 within the peripheral flange or sleeve 43 and at its other extremity bears against the undersurface of the boss 34. The spring 45 normally urges the bolt 35 downwardly away from the cap 31 so as to retract the threaded end 36 of the camera attaching bolt into the aperture 37. When in retracted position the threads of the bolt 35 can not be injured by accidentally striking the bolt against a projection in carrying the tripod.

It will be noted that the lower end of the bolt 35 projects below the flange 42 of the nut 40. It will also be noted that the bolt 20 extends only a portion of the distance through the clamping nut 27. A central recess 46 is thus formed within the clamping nut 27 and coaxial therewith into which the lower end of the bolt 35 may extend in retracted position of this bolt. The engagement of the bolt 35 into the recess has two purposes. In the first place the recess 46 forms a bearing for the lower end of the bolt 35 as this bolt is retracted. In the second place this arrangement holds the swivel head 22 aligned with the head body 10 when the camera is not attached thereto. Thus when the tripod is not in use, the swivel head is in axial alignment with the tripod head and is not free to swing or pivot during the handling of the tripod.

The operation of my tripod is believed obvious from the foregoing description. When the tripod is placed in a standing position the swivel head 22 is in alignment with the tripod head so that as the bolt 35 is retracted, the camera is placed over the swivel head 22 and the bolt 35 is grasped by the fingers and raised upwardly until the upper threaded end 36 of the bolt projects above the aperture 37. By rotating the bolt 35 this bolt may be engaged in the socket 39 of the camera B.

The angularity of the camera and the swivel head attached thereto may be regulated by loosening the clamping nut 27 and swinging the swivel head into the desired position. This may be done while looking through the finder of the camera if so desired, as the clamping nut is readily accessible and may be readily actuated while looking through the camera finder. When the camera is at the proper angle relative to the tripod head, the clamping nut 27 is tightened, forcing the clamping member 26 against the lower curved end of the swivel head and clamping this curved swivel head end against the surface of the socket 25.

In accordance with the patent statutes, I have described the principles of construction and operation of my camera tripod, and while I have endeavored to set forth the best embodiment thereof, I desire to have it understood that obvious changes may be made within the scope of the following claims without departing from the spirit of my invention.

I claim:

1. A tripod including a tripod head, a swivel head, a socket in said tripod head, a rounded lower end on said swivel head engageable in said socket, an axial aperture in said swivel head, a clamping member within said swivel head, threaded means extending through said clamping member and said aperture and into said tripod head, means on the upper extremity of said threaded member, said last named means being engageable against said clamping member, an axial aperture in said last named means, a closed upper end on said swivel head, an axial aperture therein, a camera engaging bolt slidable in said aperture, a collar on said bolt intermediate the ends thereof, the lower end of said clamping bolt being engageable in said aperture in said means on said threaded member when these two elements are in alignment, and spring means between said collar and said closed upper end urging said camera engaging bolt into said aperture.

2. A tripod including a tripod head having a socket in the upper surface thereof, an elongated swivel head including a hollow cylindrical body having a rounded lower end, an aperture in said rounded lower end, a clamping member within said hollow swivel head shaped to fit the curvature of the rounded lower end, a threaded member extending through said tripod head, through said aperture and through said clamping member, means on said threaded element engageable against said clamping member to clamp the same against the rounded lower end of said swivel head, the aperture in said swivel head being of considerably greater size than the diameter of said threaded element, and a pair of diametrically opposed elongated slots in said swivel head extending from the upper end thereof to a point adjacent the rounded lower end thereof.

3. The structure described in claim 2 and including a closed upper end on said swivel head, an aperture in said closed upper end, a threaded element extending through said aperture in said closed upper end, a knob on said last named threaded element within said swivel head, said last named threaded element being engageable with the means on said first named threaded element to limit downward movement thereof, a circular groove in the upper surface of said knob and a spring interposed between the base of said groove and said closed upper end.

4. A tripod including a tripod head having a concave socket in the upper surface thereof, an elongated swivel head including a hollow body having a rounded lower end and having an aperture therethrough, a clamping member within said rounded lower end, a threaded member extending into said tripod head, through said aperture and through said clamping member, means on said threaded element engageable against said clamping member to clamp the same against the rounded lower end of said swivel head, the aperture in the swivel head being of considerably greater size than the diameter of said threaded element, and elongated slot means in said swivel head above said rounded lower end to permit the insertion of fingers into the interior of the swivel head.

5. The construction described in claim 4 and in which the swivel head is provided with a top closure member, a threaded element extendable through said closure member, knob means on said last named threaded element within said swivel head by means of which the last named threaded element may be rotated, a groove in the upper surface of said knob concentric with the center thereof, and a spring in said groove between the base of the groove and the top closure of the swivel head.

6. The structure described in claim 4 in which the means on the threaded element for engaging against the clamping member comprises a nut having a threaded aperture therein for accommodating the threaded element, the aperture extending beyond the end of the threaded element, a closed upper end on said swivel head, a bolt extending through said closed upper end and having means thereupon within said swivel head by means of which said bolt may be rotated, a downward axial projection projecting downwardly from said bolt, said projection being engageable in the aperture in said nut when the threaded element and bolt are in alignment.

7. The structure described in claim 4 and in which the means on the threaded element for engaging the clamping member comprises a nut having a threaded aperture therethrough for accommodating said threaded element, the aperture extending beyond the upper end of the threaded element, a closed upper end on the swivel head, a bolt extending through the closed upper end and having means thereupon for rotating the bolt, a downward projection aligned with the bolt, said projection being engageable into the aperture of said nut in one position of said elements, and means on the upper surface of said nut into which said projection may extend in other relative positions of said threaded element.

HORACE N. GIBSON.

REFERENCES CITED

The following references are of record in the file of this patent:

UNITED STATES PATENTS

| Number | Name | Date |
|---|---|---|
| 464,384 | Osborne | Dec. 1, 1891 |
| 508,319 | Ivarson | Nov. 7, 1893 |
| 672,703 | Esmond | Apr. 23, 1901 |
| 1,536,985 | Swinford | May 5, 1925 |
| 1,794,726 | Mitchell | Mar. 3, 1931 |
| 1,812,614 | Viken | June 30, 1931 |
| 1,870,766 | Beistle | Aug. 9, 1932 |
| 2,318,910 | Zucker | May 11, 1943 |